United States Patent
Liao

(10) Patent No.: US 9,591,063 B2
(45) Date of Patent: Mar. 7, 2017

(54) PARALLEL COMMUNITY DETECTION

(71) Applicant: SAS Institute Inc., Cary, NC (US)

(72) Inventor: Yi Liao, Cary, NC (US)

(73) Assignee: SAS Institute Inc., Cary, NC (US)

( * ) Notice: Subject to any disclaimer, the term of this patent is extended or adjusted under 35 U.S.C. 154(b) by 335 days.

(21) Appl. No.: 14/196,571

(22) Filed: Mar. 4, 2014

(65) Prior Publication Data
US 2014/0258454 A1 Sep. 11, 2014

Related U.S. Application Data

(60) Provisional application No. 61/775,562, filed on Mar. 9, 2013.

(51) Int. Cl.
*G06F 15/16* (2006.01)
*H04L 29/08* (2006.01)

(52) U.S. Cl.
CPC .................................. *H04L 67/10* (2013.01)

(58) Field of Classification Search
CPC ......... G06F 17/30; G06F 15/173; H04L 67/10
See application file for complete search history.

(56) References Cited

U.S. PATENT DOCUMENTS

2011/0247003 A1* 10/2011 Fong ..................... G06F 9/5061
                                                                718/104
2012/0297085 A1* 11/2012 Jeng .................... H04L 12/4013
                                                                709/234
2013/0268595 A1* 10/2013 Mohan ..................... H04L 51/32
                                                                709/204
2014/0067808 A1* 3/2014 Narang .................. G06Q 10/04
                                                                707/737

OTHER PUBLICATIONS

Soman et al., "Fast Community Detection Algorithm With GPUs and Multicore Architectures", 2011 IEEE International Parallel & Distributed Processing Symposium, 2011, 12 pages.

(Continued)

*Primary Examiner* — Vivek Srivastava
*Assistant Examiner* — Normin Abedin

(57) ABSTRACT

Various embodiments are directed to techniques for countering oscillation in community assignments of nodes in a network during detection of its communities. A computer-program product tangibly embodied in a non-transitory machine-readable storage medium includes instructions operable to cause a computing device to derive a first connectedness metric of a first community to which a first node of a network belongs and a second connectedness metric of a second community to which a second node of the network belongs in parallel in an iteration of parallel detection of communities in the network, wherein the first and second nodes are connected in the network; randomly pin the first node to prevent its reassignment to another community during the iteration; compare the first and second connectedness metrics during the iteration; and reassign the second node from the second community to the first community based on the comparison. Other embodiments are described and claimed.

27 Claims, 13 Drawing Sheets

(56) References Cited

OTHER PUBLICATIONS

Blondel et al., "Fast unfolding of communities in large networks", Journal of Statistical Mechanics: Theory and Experiments 2008, 12 pages.
Raghavan et al., Near linear time algorithm to detect community structure in large-scale networks, Physical Review E 76, 036106 (2007), 12 pages.
Rosvall et al. "The map equation", arXiv:0906.1405, 2009, 9 pages.
Zachary, W. W. ,"An information flow model for conflict and fission in small groups", Journal of Anthropological Research, vol. 33, No. 4 (Winter, 1977), 23 pages.
Newman, M.E. J., "Modularity and community structure in networks", Proceedings—National Academy of Sciences USA, 2006, 7 pages.
SAS Institute Inc., "SAS Optgraph Procedure 12.1 Graph Algorithms and Network Analysis", Aug. 1, 2012, pp. 1-221.

\* cited by examiner

US 9,591,063 B2

PARALLEL COMMUNITY DETECTION

CROSS-REFERENCE TO RELATED APPLICATION

This application claims the benefit of priority under 35 U.S.C. §119(e) to U.S. Provisional Application Ser. No. 61/775,562 entitled PARALLEL COMMUNITY DETECTION filed Mar. 9, 2013, the entirety of which is incorporated herein by reference.

BACKGROUND

Solving some large-scale problems entails analyzing the manner in which a very large number of nodes are linked in a very large network (e.g., a network of millions or billions of nodes interconnected with millions or billions of links). The nodes of such networks may represent people or any of a variety of types of objects, and the links may represent any of a variety of relationships (e.g., connections in a social network) or interactions (e.g., exchanges of voice or data communications) between those nodes. Real-world networks often have a structure in which there are clusters or "communities" of densely interconnected nodes separated by portions of the network where the nodes are less densely interconnected. Identifying such communities is often a part of analyzing very large networks, and often requires significant processing resources and time.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

A computer-program product tangibly embodied in a non-transitory machine-readable storage medium includes instructions operable to cause a computing device to derive a first connectedness metric of a first community to which a first node of a network belongs and a second connectedness metric of a second community to which a second node of the network belongs in parallel in an iteration of parallel detection of communities in the network, wherein the first and second nodes are connected by a link of the network; randomly pin the first node to prevent reassignment of the first node to another community during the iteration; compare the first and second connectedness metrics during the iteration; and reassign the second node from the second community to the first community based on the comparison of the first and second connectedness metrics.

A computer-implemented method includes deriving a first connectedness metric of a first community to which a first node of a network belongs and a second connectedness metric of a second community to which a second node of the network belongs in parallel in an iteration of parallel detection of communities in the network, wherein the first and second nodes are connected by a link of the network; randomly pinning the first node to prevent reassignment of the first node to another community during the iteration; comparing the first and second connectedness metrics during the iteration; and reassigning the second node from the second community to the first community based on the comparison of the first and second connectedness metrics.

An apparatus includes a processor component a parallel detection component for execution by the processor component to derive a first connectedness metric of a first community to which a first node of a network belongs and a second connectedness metric of a second community to which a second node of the network belongs in parallel in an iteration of parallel detection of communities in the network, compare the first and second connectedness metrics during the iteration, and reassign the first node from the first community to the second community based on the comparison of the first and second connectedness metrics; and a pinning component for execution by the processor component to randomly pin the second node to prevent reassignment of the second node to another community during the iteration.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
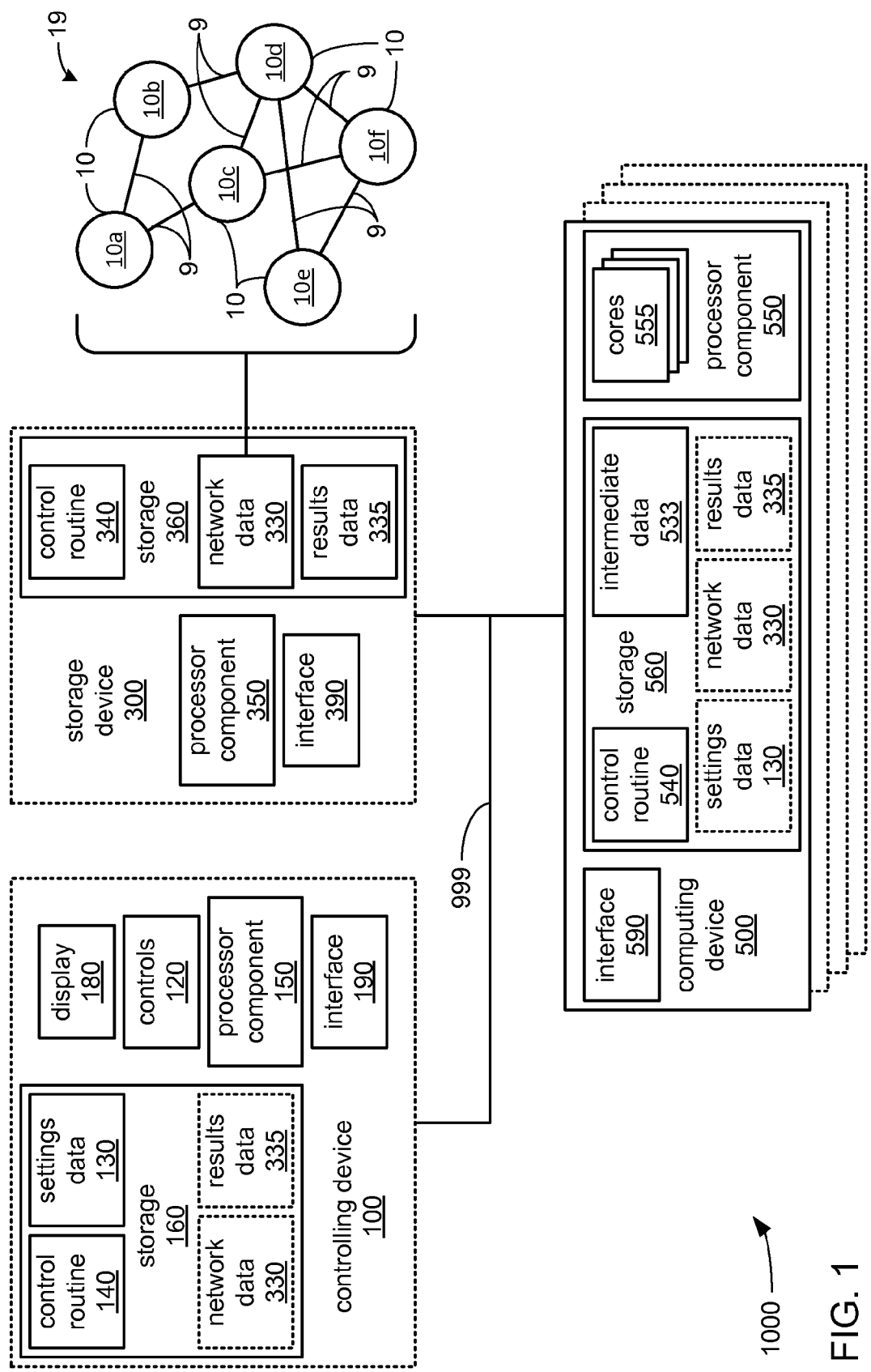
FIG. 1 illustrates an example of an embodiment of a community detection system.

Various embodiments are generally directed to techniques for countering oscillation in the community assignment of nodes in a network during detection of communities in the network. In each of multiple iterations, the communities of all nodes and the neighboring nodes to which they are directly coupled via a single link are analyzed to derive metrics of connectedness and comparisons of those metrics are made in parallel to identify nodes that should be reassigned to different communities. Then, with such analysis for all of the nodes completed, all of such reassignments of nodes to different communities (if there are any) are performed in parallel. Thus, each iteration entails parallel performance of analyses of connectedness for all nodes followed by selective reassignment of nodes among communities. However, in each iteration, a subset of the nodes is selected to be "pinned" to whatever community to which they are already assigned to prevent their reassignment to other communities during that iteration. In this way, nodes that would otherwise oscillate between assignment to one or the other of two communities with each iteration will cease oscillating, thereby enabling more effective identification of communities.

In preparation for identifying communities, each node is assigned to its own individual community such that, initially, there are as many communities as there are nodes. Thus, in the first iteration, there will be as many communities to analyze the connectedness of as there are nodes.

The performance of numerous iterations of parallel community detection then begins. In each iteration, metrics of connectedness for the communities to which each node and its neighboring nodes belong are derived in parallel. The type of metric derived may be based on any of a variety of functions that have been proposed in the art for determining a degree of connectedness, including and not limited to, a Louvain modularity function, a label propagation function and an Infomap map function. Parallel comparisons are then made between that metric for the community to which each node is currently assigned and that metric for the community or communities to which each of the neighbors of each node is assigned. Nodes that are determined by the comparisons to be assigned to a community having a higher degree of connectedness than the degree of connectedness of the communities to which any of their neighbors are assigned are caused to remain assigned to their communities. Nodes that are determined to be assigned to a community having a lower degree of connected than the degree of connectedness of at least one community to which any of their neighbors are assigned are reassigned to whichever community among its neighbors has the highest degree of connectedness. However, any such reassignment of nodes to other communities does not take place until after derivation and comparison of the metrics for all nodes is complete, and then all of such reassignments (if there are any) are performed in parallel in preparation for the next iteration.

To address the oscillation issue, in each iteration, one or more of such reassignments that would otherwise be performed are prevented from occurring. In each iteration, a random selection of a subset of the nodes is made, and the nodes of that random subset of each iteration are "pinned" to whatever communities they are already assigned to at the start of that iteration. These "pinned" nodes are prevented from changing the communities to which they are assigned, regardless of what a comparison of metrics may reveal about the connectedness of their communities relative to those of their neighbors. This random pinning of nodes in each iteration is intended to break the continued oscillating of at least some nodes between being assigned to one or the other of two communities in each iteration. Such oscillating often occurs as a result of particular configurations of links among neighboring nodes such that multiple ones of those neighboring nodes switch in a coordinated manner between the same two communities in each iteration. With random pinning of nodes, at least one of such nodes is prevented from changing communities in a single iteration, thereby breaking such coordination in switching between communities and enabling one or more of those neighboring nodes to settle into a lasting assignment to a community.

The iterations of parallel community detection continue until either an iteration occurs in which no nodes change their assignments to communities or a predetermined maximum quantity of iterations has been performed. If one or more nodes continue to oscillate, a further quantity of iterations of sequential community detection may be performed in which the analysis of connectedness of communities and reassignment of nodes occurs one node at a time, instead of in parallel. This uses the sequential processing of nodes as another mechanism to break the coordination of oscillation among at least some oscillating nodes to cause further settling into assignments to communities. Such iterations of sequential community detection may continue until either an iteration occurs in which no nodes change their community assignments or another predetermined maximum quantity of iterations has been performed.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other iterations, well known structures and devices are shown in block diagram form in order to facilitate a description thereof. The intention is to cover all modifications, equivalents, and alternatives within the scope of the claims.

FIG. 1 illustrates an example of a block diagram of an embodiment of a community detection system 1000 incorporating a controlling device 100, a storage device 300 and/or one or more computing devices 500. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc. Embodiments are not limited in this context.

As depicted, these computing devices 100, 300 and 500 exchange communications conveying data and/or coordinating communications to detect communities in a network 19 via a network 999. However, one or more of the computing devices 100, 300 and/or 500 may exchange other entirely unrelated data with each other and/or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission. As will also be explained in greater detail, in some embodiments, the networks 19 and 999 may be one and the same network. In other words, the network employed to coordinate detection of communities may be the same network in which those communities are detected.

The controlling device 100 may be present in some embodiments of the community detection system 1000 to control the performance of community detection by one or more of the computing devices 500. The storage device 300 may be present in some embodiments of the community detection system 1000 to store data concerning the network 19 that serves as an input to the community detection performed by the computing device(s) 500, and/or to store data output by the community detection indicating the results thereof. There may be one or more of the computing devices 500 employed in the community detection system 1000 to actually perform the detection of communities in the network 19.

In various embodiments, the controlling device 100, if present, incorporates one or more of a processor component 150, a storage 160, controls 120, a display 180 and an interface 190 to couple the controlling device 100 to the network 999. The storage 160 stores one or more of a settings data 130, a control routine 140, a network data 330 and a results data 335. The control routine 140 incorporates a sequence of instructions operative on the processor component 150 to implement logic to perform various functions.

In executing the control routine 140, the processor component 150 may operate the controls 120 and/or the display 180 to provide a user interface by which one or more commands may be received to direct performance of community detection and/or to select the network 19 for community detection. Alternatively or additionally, one or more settings may be received through such a user interface to set various community detection parameters, such as the type of metric calculated to determine the degree of connectedness of communities. In response to receiving such input, the processor component 150 may trigger the one or more computing devices 500 to perform detection of communities of within network 19, and may specify various parameters that may have been received from such input to the computing device(s) 500.

During the performance of detection of communities of the network 19 in embodiments in which more than one of the computing devices 500 are employed, the processor component 150 may operate the interface 190 to exchange communications with the computing devices 500 to coordinate their performance of community detection, at least to some degree. Following performance of detection of communities of the network 19, the processor component 150 may receive and analyze the results of the community detection to determine the degree to which the results are likely to reflect the reality of whatever community structure may actually exist in the network 19.

In various embodiments, the storage device 300, if present, incorporates one or more of a processor component 350, a storage 360 and an interface 390 to couple the storage device 300 to the network 999. The storage 360 stores one or more of a network data 330, a results data 335 and a control routine 340. The network data 330 provides a description of all of the nodes 10 and links 9 that make up the network 19. The control routine 340 incorporates a sequence of instructions operative on the processor component 350 to implement logic to perform various functions.

The computing device(s) 500 may be triggered by the controlling device 100 to retrieve the network data 330 from the storage device 300 as input to detecting communities within the network 19. In executing the control routine 340, the processor component 350 may operate the interface 390 to transmit at least a portion of the network data 330 to one or more of the computing devices 500 in response to requests therefrom for such data. The computing device(s) 500 may subsequently store the results of the community detection in the storage 360 of the storage device 300 as the results data 335. The processor component 350 may receive portions of the results data 335 from more than one of the computing devices 500 and may assemble those portions to form the results data 335 as stored in the storage 360. The processor component 350 may additionally provide one or both of the network data 330 and the results data 335 to the controlling device 100 for analysis.

In various embodiments, each of the one or more computing devices 500 incorporates one or more of a processor component 550, a storage 560 and an interface 590 to couple the computing device 500 to the network 999. The processor component 550 may incorporate more than one core 555 to enable concurrent processing of multiple threads. The storage 560 stores one or more of the settings data 130, the network data 330, the results data 335, an intermediate data 533 and a control routine 540. The control routine 540 incorporates a sequence of instructions operative on the processor component 550 to implement logic to perform various functions.

In executing the control routine 540, the processor component 550 of at least one of the computing devices 500 performs the parallel detection of communities of the network 19. In some embodiments, multiple ones of the cores 555 of at least one processor component 550 of at least one of the computing device 500 are employed to process multiple ones of the nodes 10 in parallel across multiple threads. Alternatively or additionally, multiple ones of the computing devices 500 are employed to process multiple ones of the nodes 10 in parallel across multiple threads executed by multiple processor components 550.

In embodiments in which only one of the computing devices 500 is employed, its processor component 550 may operate the interface 590 to command the storage device 300 to provide the network data 330. The processor component 550 may do this in response to receiving an indication from the controlling device 100 that the network data 330 describing the network 19 may be retrieved from the storage device 300. Such an indication may be conveyed to the computing device 500 in the form of the settings data 130, which may specify the storage device 300 as an available source of the network data 330 and/or as the destination to which the results data 335 is to be conveyed. In embodiments in which multiple ones of the computing devices 500 are employed, the processor components 550 of each may operate their respective ones of the interface 590 to retrieve at least a portion of the network data 330 from the storage device 300. Again, the processor components 550 may do so in response to each receiving at least a portion of the settings data 130.

In preparation for identifying communities in the network 19, each of the nodes 10 is assigned to its own individual community such that, initially, each of the nodes 10 becomes a community onto itself. The processor component 550 may generate the intermediate data 533 to maintain an indication of the current state of performance of community detection, and the intermediate data 533 may initially indicate the assignment of each node 10 to its own individual community. In embodiments in which multiple cores 555 of the processor component 550 are employed (and/or multiple processor components 550 of a single computing device 500 are employed), the intermediate data 533 may serve as a mechanism to coordinate the parallel processing of the nodes 10 among the threads distributed among the processor components 550 and/or cores 555.

In embodiments in which multiple ones of the computing devices 500 are employed, the processor components 550 of each may operate their respective interface 590 to recurringly exchange at least portions of the intermediate data 533 maintained by each as part of coordinating the parallel processing of the nodes 10 among the threads distributed among the computing devices 500. Such exchanges may be performed directly among the computing devices 500, or through one or both of the controlling device 100 and the storage device 300. By way of example, an aggregate version of the intermediate data 533 may be maintained by one or the other of the controlling device 100 or the storage device 300, which may receive updates for the contents of the intermediate data 533 from each of the computing devices 500 and may send updates of the contents of its copy of the intermediate data 533 to the computing devices 500.

Following such initialization to assign all of the nodes 10 to individual communities, the processor component(s) 550 of the one or more computing devices 500 commence performing numerous iterations of parallel community detection. Upon beginning each iteration, a connectedness metric is derived for all communities in the network 19. Then, for each of the nodes 10, the metric of the community that it belongs to is compared to the metrics of the communities to which each of its neighboring nodes (e.g., the other nodes to which it is directly connected) belongs. For each of the nodes 10, if the community to which it belongs has a lesser degree of connectedness than another community to which one of its neighboring nodes 10 belongs, then the node 10 is selected to be reassigned to that other community, and those reassignments are performed before the iteration ends. The derivations of the connectedness metrics are performed in parallel, as are the comparisons of the connectedness metrics. Further, the reassignments of nodes (if any reassignments occur) are also performed in parallel.

Figure 3A:
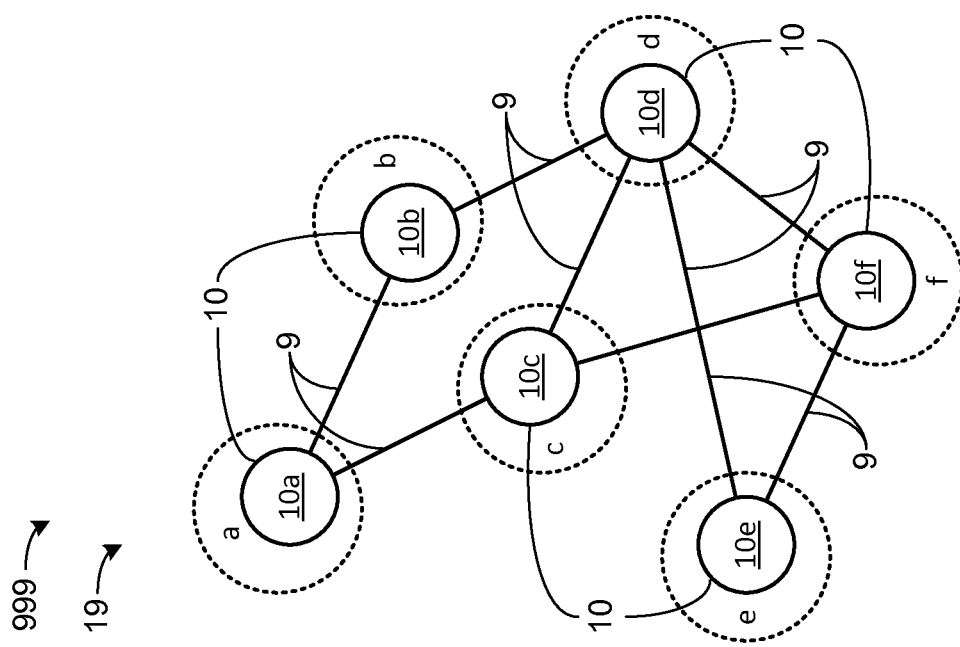
FIGS. 3A-C illustrate an example of parallel detection of communities.
Figure 3C:
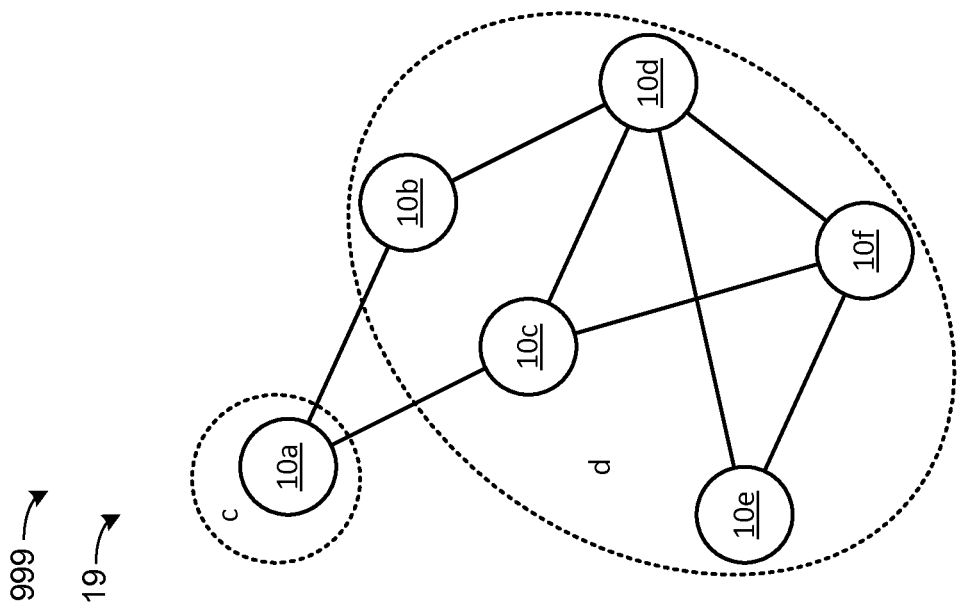
Figure 3B:
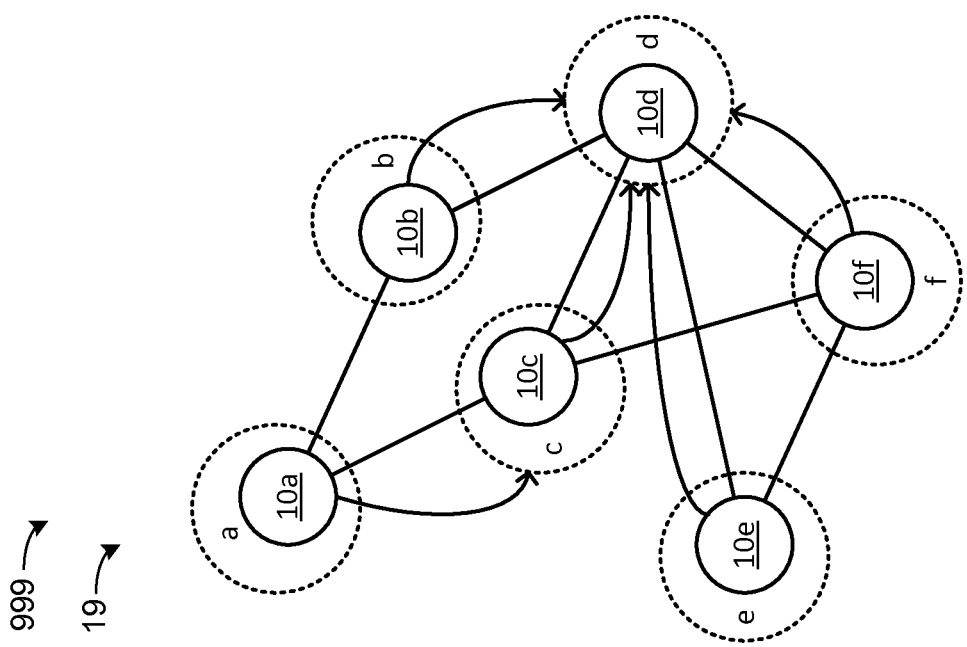

FIGS. 3A, 3B and 3C, together, depict an example of initialization followed by one iteration of parallel community detection. FIGS. 3A-C depict the network 19 of FIG. 1 made up of six nodes 10 (individually labeled as nodes 10a through 10f) and the links 9 by which they are connected. As depicted, node 10a is directly connected by two different links 9 to nodes 10b and 10c such that nodes 10b and 10c are the neighboring nodes of node 10a. The other nodes 10d, 10e and 10f are not directly connected to node 10a, and therefore, are not neighbors of node 10a. Correspondingly, the neighbors of node 10b are nodes 10a and 10d; the neighbors of node 10c are nodes 10a, 10d and 10f; the neighbors of node 10d are nodes 10b, 10c, 10e and 10f; the neighbors of node 10e are nodes 10d and 10f; and the neighbors of node 10f are nodes 10c, 10d and 10e. It should be noted that the depicted network 19 is a very simple network that is presented herein to facilitate understanding, and should not be taken as limiting what is described herein to such simple networks.

FIG. 3A depicts initialization in preparation for parallel detection of communities. Specifically, each of the nodes 10a through 10f is assigned to its own individual group, labeled "a" through "f" in FIG. 3A, respectively. FIGS. 3B and 3C, together, depict events occurring during the first iteration of parallel detection following the initialization depicted in FIG. 3A. Specifically, turning to FIG. 3B, connectedness metrics are derived for all of the communities to which the nodes 10a-f belong, specifically, all of communities "a" through "f." The derivation of all of these connectedness metrics occurs in parallel.

Then, for each of the nodes 10a-f, a comparison is made of the connectedness metric of the community of that node to the connectedness metric of the communities to which each of its neighboring nodes belong. Thus, for node 10a, a comparison is made of the connectedness metric of community "a" to the connectedness metrics of each of communities "b" and "c," since communities "b" and "c" are the communities to which its neighboring nodes 10b and 10c belong. Correspondingly, for node 10b, a comparison is made of the connectedness metric of its community "b" to the connectedness metrics of communities "a" and "d"; for node 10c, a comparison is made of the connectedness metric of its community "c" to the connectedness metrics of communities "a," "d" and "f"; for node 10d, a comparison is made of the connectedness metric of its community "d" to the connectedness metrics of communities "b," "c," "e" and "f"; for node 10e, a comparison is made of the connectedness metric of its community "e" to the connectedness metrics of communities "d" and "f"; and for node 10f, a comparison is made of the connectedness metric of its community "f" to the connectedness metrics of communities "c," "d" and "e". These comparisons of these connectedness metrics occur in parallel.

Then, for each of the nodes 10a-f, if the community to which it belongs has a lesser degree of connectedness than one of the communities to which one of its neighboring nodes belongs, then that node is selected to be reassigned to whichever community of one of its neighboring nodes has the greatest degree of connectedness. However, for each of these nodes, if the community to which it belongs has a greater degree of connectedness than any of the communities to which any of its neighboring nodes belong, then that node is not selected to be reassigned to another community and remains within the community to which it already belongs. Thus, as depicted with arrows in FIG. 3B, node 10a is selected to be reassigned to community "c" as a result of community "c" having a greater degree of connectedness than community "a"; node 10b is selected to be reassigned to community "d" as a result of community "d" having a greater degree of connectedness than community "b"; node 10c is selected to be reassigned to community "d" as a result of community "d" having a greater degree of connectedness than community "c"; node 10e is selected to be reassigned to community "d" as a result of community "d" having a greater degree of connectedness than community "e"; and node 10f is selected to be reassigned to community "d" as a result of community "d" having a greater degree of connectedness than community "f." However, node 10d is not selected to be reassigned to any other community as a result of community "d" (to which node 10d already belongs) having a greater degree of connectedness than any of communities "b," "c," "e" or "f" (the communities to which all of the neighboring nodes of node 10d belong). These determinations of which nodes are selected to be reassigned, and to what other communities, are made in parallel.

Then, the reassignments are performed in parallel for whatever ones of the nodes 10a-f were selected to be reassigned. FIG. 3C depicts the results the performance of the aforedescribed reassignments of nodes 10a, 10b, 10c, 10e and 10f, while node 10d is not reassigned. Node 10a became a member of community "c" even as node 10c switched from being a member of community "c" to become a member of community "d." Nodes 10b, 10e and 10f also became members of community "d." As depicted, with these reassignments, communities "a," "b," "e" and "f" effectively cease to exist. With these reassignments effected, this iteration ends.

However, in each iteration, a few of the nodes 10 may be randomly selected to be "pinned" to remain assigned to whatever communities to which they are already assigned at the start of that iteration. More precisely, in some embodiments, ones of the nodes 10 to be pinned may be randomly selected at the start of each iteration, before any derivation or comparison of degrees of connectedness of communities of the nodes 10 or their neighboring nodes 10 is performed. In such embodiments, the randomly selected ones of the nodes 10 to be pinned may or may not be among the nodes that would have been selected to have their communities changed during that iteration. In other embodiments, the derivations and comparisons of degrees of connectedness of the communities of those nodes and their neighbors may be performed first, to select the ones of the nodes 10 (if any) that are to have their communities changed, and then the random selection of nodes to be pinned may from among only the selected ones of the nodes 10. The quantity of nodes to be randomly selected and/or the proportion of nodes to be randomly selected may be specified in the settings data 130.

As has been discussed, parallel performance of derivations of metrics, comparisons to select nodes, and reassignments of selected nodes of real world networks has been found to greatly increase the likelihood of oscillations of assignments of one or more nodes between communities. These oscillations can continue indefinitely. As recognizable to those skilled in the art, such oscillations can arise in clusters of nodes linked in one or more particular configurations that influence the metrics for the communities of those nodes in a manner that causes a recurring oscillation in outcomes of the comparisons that lead to those nodes being repeatedly selected to change their community assignments. One such configurations of linkages is commonly referred to as a bipartite structure.

Figure 4A:
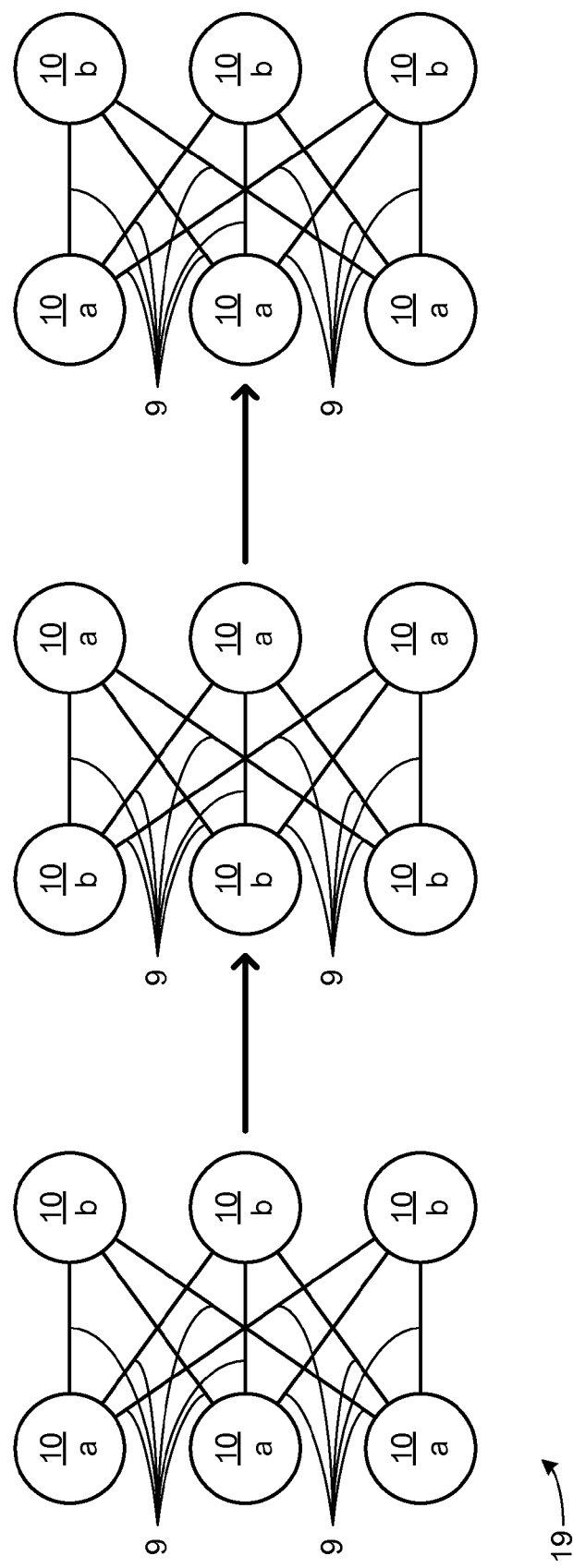
FIGS. 4A-C illustrate an example of oscillating reassignment of nodes to communities and pinning a node according to an embodiment to address the oscillation.

FIG. 4A illustrates an example of oscillation in a bipartite structure within the network 19 that incorporates six of the nodes 10 that are linked with a specific depicted configuration of the links 9. Among these six of the nodes 10, three are assigned to a community "a" and the other three are assigned to a community "b" of the network 19. It is important to note that the nodes of such a bipartite structure as the one depicted in FIG. 4A may also be coupled to still other nodes by still other links (not shown). However, it is the particular bipartite configuration of the links 9 among the depicted six of the nodes 10 that enables an oscillation in which, with each iteration, three of the nodes 10 assigned to the community "a" change to being assigned to the community "b," and three of the nodes 10 assigned to the community "b" change to being assigned to the community "a." This oscillation can continue indefinitely unless there is a sufficient change that occurs in others of the nodes 10 coupled to one or more of these six nodes 10 that changes the results of the derivation and/or comparison of metrics for the community "a" or the community "b." However, such a sufficient change seldom occurs, thereby enabling many real world networks to develop oscillations among clusters of nodes such as this depicted cluster of six.

Figure 4C:
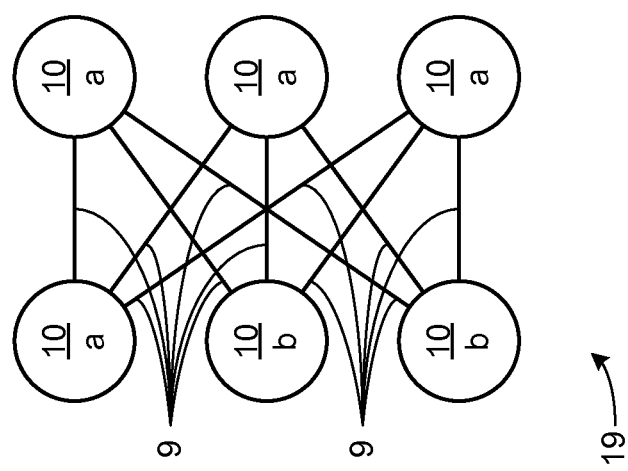
Figure 4B:
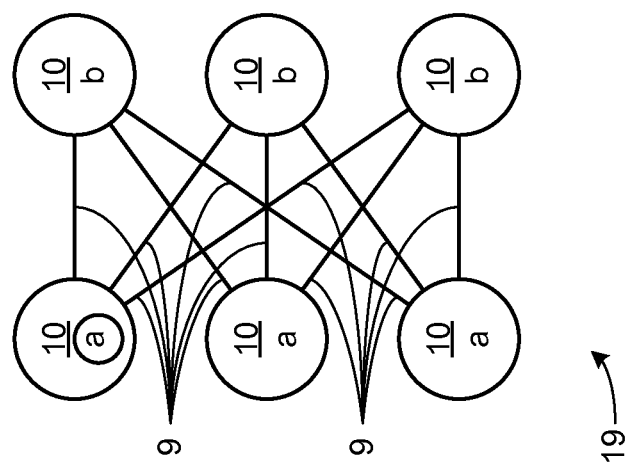

FIGS. 4B and 4C, together, depict an example of pinning a randomly selected node 10 to prevent or cease the oscillation exemplified in FIG. 4A. Again, to reduce the number of such clusters of nodes engaged in such oscillating behavior in the network 19, a subset of the nodes 10 is randomly selected in each iteration to be "pinned" to whatever community they are assigned to at the beginning of that iteration such that their community assignments do not change during that iteration. As depicted in FIG. 4B, one of the six nodes 10 is "pinned" as indicated by a circle surrounding the letter "a" in FIG. 4B to remain assigned to the community "a" through an iteration that starts with the six nodes 10 assigned to communities as depicted in FIG. 4B and ends with the six nodes 10 assigned to communities "a" and "b" as depicted in FIG. 4C. As a result, despite the occurrence of a change between the communities "a" and "b" by the other five of the six nodes 10 during the iteration, the one of the six nodes 10 that was "pinned" to the community "a" remains assigned to the community "a," as depicted in FIG. 4C. In the next iteration, the one of these six of the nodes 10 that was "pinned" ceases to be "pinned" such that it is able to again switch its assignment to another community (unless this same node 10 is randomly selected to be "pinned" a second time). However, the symmetry of assignment of these six nodes to communities "a" and "b" has been broken such that, in the next iteration, one or more of these six of the nodes 10 should begin to settle towards lasting community assignments. In other words, the breaking of the symmetry of two triplets of nodes switching back and forth between two communities enables non-oscillating community assignments for one or more of those nodes.

Returning to FIG. 1, as previously discussed, the connectedness metric may be based on any of a variety of functions that have been proposed in the art for determining a degree of connectedness. Indeed, the choice of function to use in calculating the metrics may be specified as a parameter in the settings data 130 that the computing device(s) 500 may receive from the controlling device 100. Among functions that are most widely used are those sometimes dubbed "local" functions such as label propagation and those sometimes dubbed "global" functions such as Louvain modularity. So-called "local" functions require only data concerning a node and its neighbors as inputs to their calculations, while so-called "global" functions require at least one piece of data that concerns all nodes of a network as an input to their calculations. Thus, the "local" functions provide the advantage of there being no need to propagate data concerning the entirety of a network to all processor components (and what may be multiple cores of each) for use in the derivation of the metrics. However, it should be noted that various embodiments may use either local or global functions.

Further, each of the functions that may be selected—whether deemed a "global" function, a "local" function, or another function—may incorporate a mechanism to prevent what is sometimes referred to as an "epidemic" spread of a community. Stated differently, each of the functions that may be used may incorporate a mechanism to tend to cause the boundaries of each identified community to correspond to where there is a lesser density of connectedness between ones of the nodes 10 (e.g., where there is a lesser density of the links 9), and to avoid ultimately assigning all of the nodes 10 to a single community. The exact mechanism to prevent such "epidemic" spread differs among the possible functions that may be selected to derive the metrics for the nodes 10.

The iterations of parallel community detection continue until either an iteration occurs in which none of the nodes 10 change their community assignments or a predetermined maximum quantity of iterations of parallel community detection has been performed. Where there continues to be one or more of the nodes 10 that oscillate in their community assignments, one or more iterations of sequential community detection may be performed in which the nodes 10 are processed sequentially (e.g., only a single node 10 is processed in each iteration). Given that such sequential processing, as previously discussed, takes considerably longer to perform, there may be a predetermined threshold of a minimum quantity of the nodes 10 that must still oscillate to trigger the performance of such sequential processing. If triggered, such iterations of sequential community detection may continue until either a series of iterations of sequential processing occur spanning all of the nodes 10 in which none of the nodes 10 change their assignments to communities, or another predetermined maximum quantity of iterations of sequential processing has been performed.

Regardless of whether performance of community detection ends with the additional performance of iterations of sequential community detection, the processor component(s) 550 of the one or more of the computing devices 500 employed in performing community detection may each operate the interface 590 to transmit at least a portion of the results data 335 to one or both of the controlling device 100 and the storage device 300. In embodiments in which multiple ones of the computing devices 500 were employed, the storage device 300 may receive portions of the results data 335 from each of the computing devices 500, and may aggregate those portions to generate the results data 335, which the processor component 350 may transmit to the controlling device 100.

The processor component 150 of the controlling device may derive a metric indicative of the degree of variation in structure (e.g., degree of variation in connectedness among the nodes 10) of the network 19. As familiar to those skilled in the art, a metric commonly referred to as "modularity" is often used in indicating the degree to which a network is found to have a structure that includes both clusters of nodes that are densely connected and clusters of nodes that are not. This modularity metric is usually represented with a single number with a theoretical range of 0 to 1. However, observations of the results of community detection in real world networks over time has revealed that most real world networks have a modularity in the range of 0.4 to 0.7. It has been observed that a modularity significantly below 0.4, which theoretically indicates a network with little in the way of complexity in its structure, may indicate a mistake or other failure in the performance of community detection for that network. Indeed, the presence of large numbers of nodes oscillating between community assignments has been known to cause such a low modularity value. It has also been observed that a modularity significantly higher than 0.7, though theoretically possible, may indicate a mistake or failure in the performance of community detection, such as an instance of epidemic spread of assignment of nodes to a single community.

The processor component 150 may compare the modularity of the results achieved by the community detection performed by the one or more computing devices 500 to such a predetermined range of likely modularity values (e.g., a range such as 0.4 to 0.7) to determine whether the results are likely to valid. Alternatively or additionally, the processor component 150 may compare the modularity of the results achieved to an indication of what is known to be the modularity value for the network 19 to determine how far the results deviate therefrom. The processor component 150 may further visually present an indication of the results of one or more of such comparisons of modularity values on the display 180.

Figure 2:
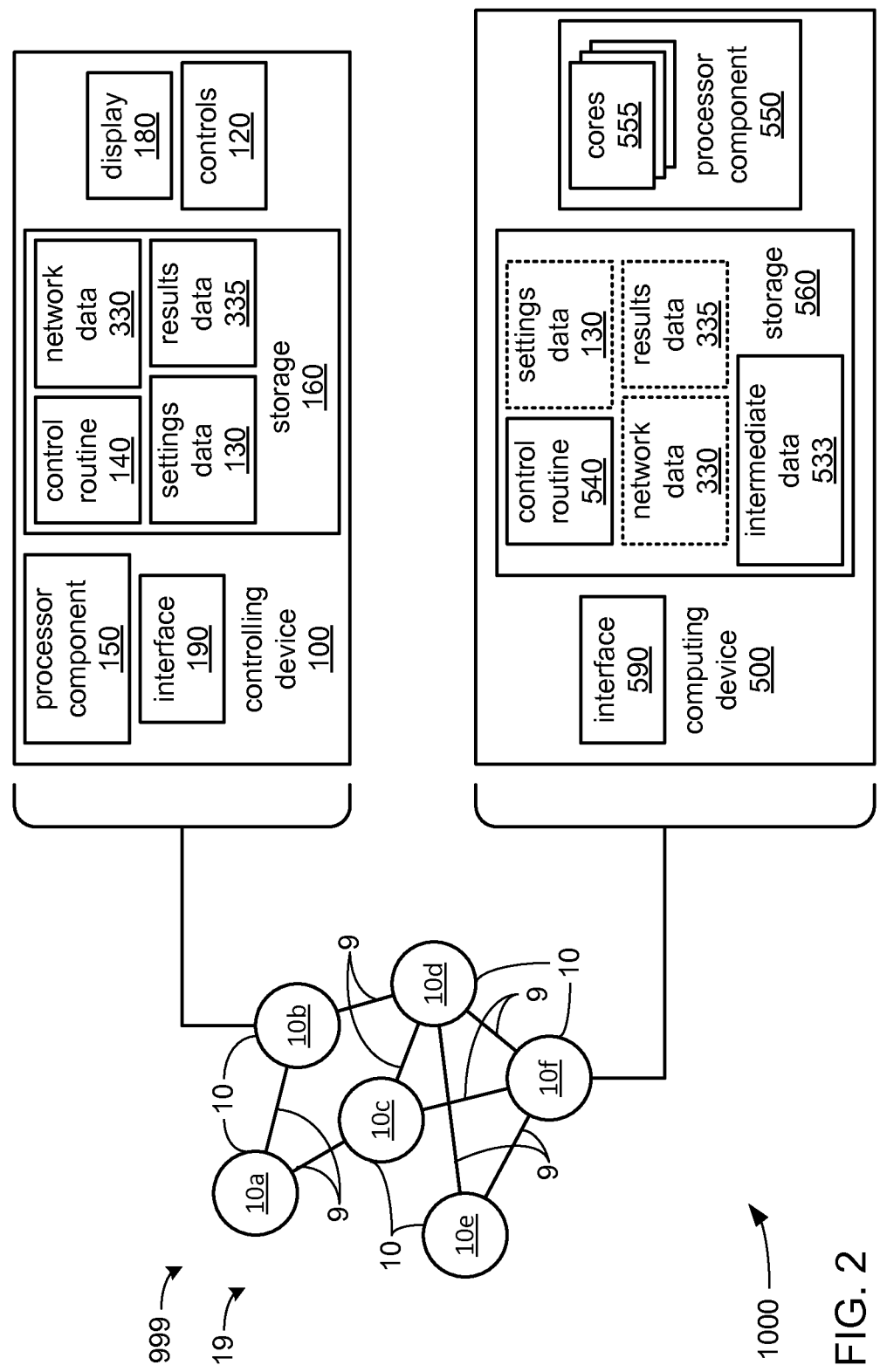
FIG. 2 illustrates an example of an alternate embodiment of a community detection system.

FIG. 2 illustrates an example of a block diagram of an alternate embodiment of the community detection system 1000 in which the networks 19 and 999 are one and the same network such that the nodes 10, themselves, are computing devices, including one more incarnations of one or both of the controlling device 100 and the computing devices 500. Thus, unlike the community detection system 1000 of FIG. 1 in which multiple ones of the computing devices 500 may coordinate via the network 999 to detect communities in another network 19 that may or may not be a network linking computing devices, at least a subset of the nodes 10 are computing devices coordinating via the network 19 to detect communities within the network 19 among computing devices.

It may be that all or nearly all of the nodes 10 are made up of computing devices that perform at least a portion of the detection of communities within the network 19 (e.g., incarnations of the computing device 500) such that the quantity of threads available across all of those computing devices is sufficient to perform the derivation and comparison of metrics for all nodes simultaneously, as well as effecting all reassignments simultaneously. Alternatively, it may be that a more limited subset of the nodes 10 are made up of such computing devices such that the quantity of threads available is more limited such that concurrent performance of the derivation and comparison of metrics is possible for numerous ones of the nodes 10 at any given time, but not all of them at the same time. In such a situation, subsets of multiple ones of the metrics may be derived in parallel until all of the metrics have been derived, using whatever capacity is available to perform as many derivations in parallel as possible. Then, subsets of multiple ones of the comparisons of metrics may be performed in parallel until all of the comparisons have been made, using whatever capacity is available to perform as many of the comparisons in parallel as possible. Then, subsets of multiple ones of the reassignments of nodes among communities may be performed in parallel until all of the reassignments have been made, using whatever capacity is available to perform as many of the reassignments in parallel as possible.

In various embodiments, each of the processor components 150, 350 and 550 may include any of a wide variety of commercially available processors. Further, one or more of these processor components may include multiple processors, a multi-threaded processor, a multi-core processor (whether the multiple cores coexist on the same or separate dies), and/or a multi processor architecture of some other variety by which multiple physically separate processors are in some way linked.

In various embodiments, each of the storages 160, 360 and 560 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 190, 390 and 590 may employ any of a wide variety of communications technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 5:
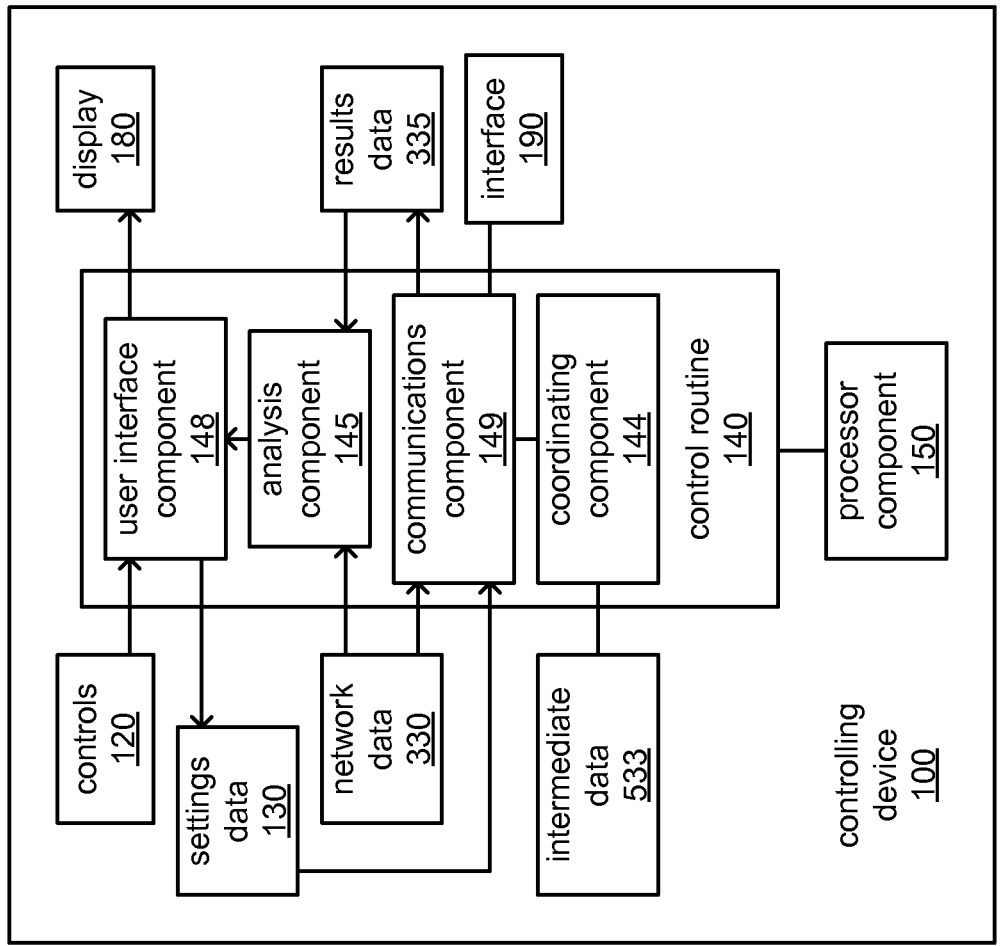
FIGS. 5, 6 and 7 illustrate examples of embodiments of operating environments for portions of a community detection system.
Figure 6:
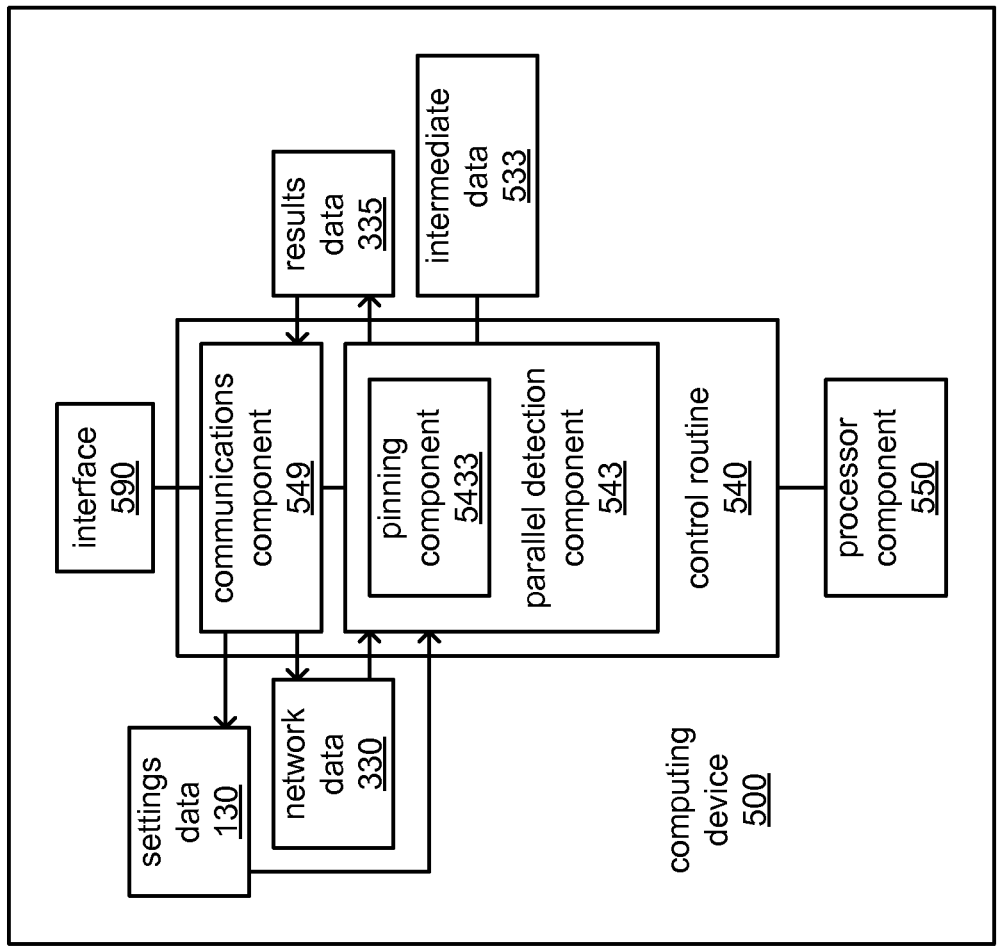
Figure 7:
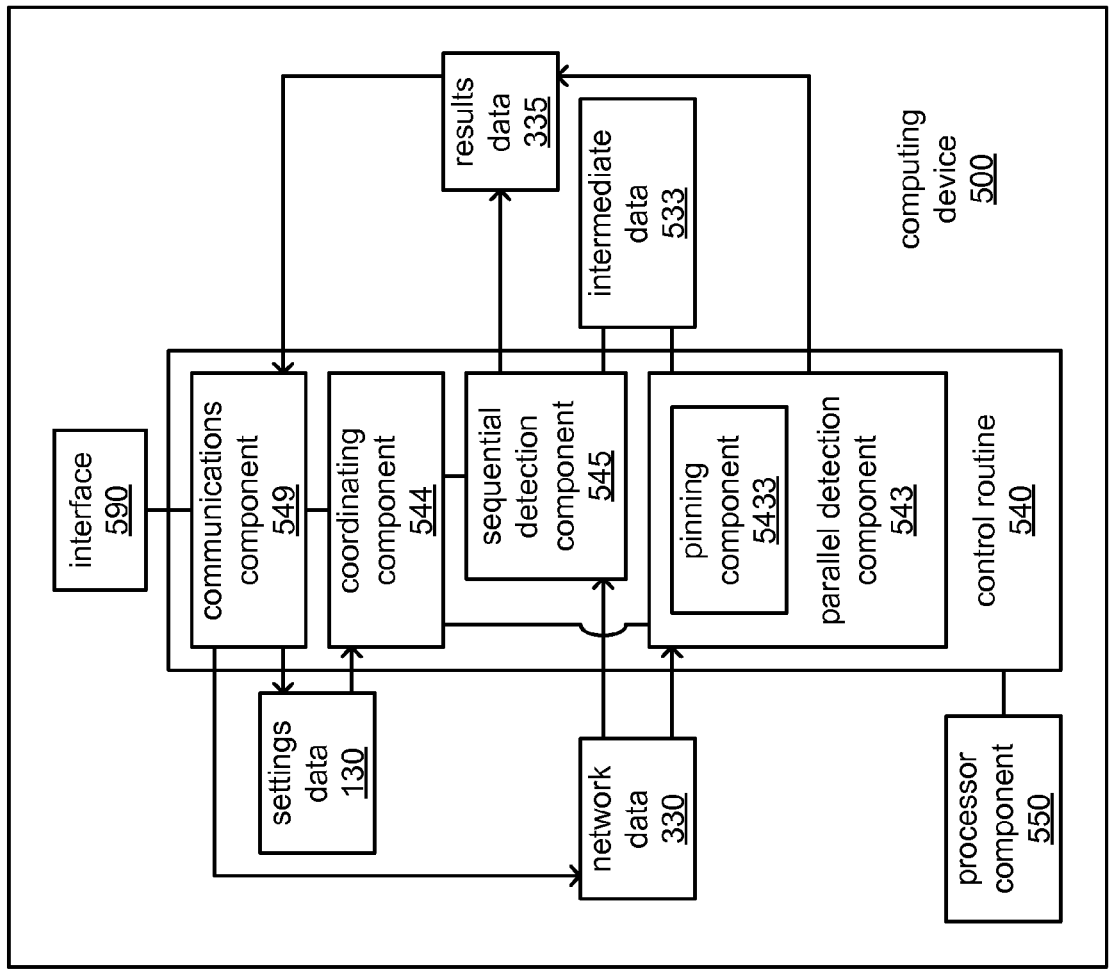

FIGS. 5, 6 and 7 each illustrate examples of a block diagram of a portion of an embodiment of the community detection system 1000 of either FIG. 1 or FIG. 2 in greater detail. More specifically, FIG. 5 depicts aspects of the operating environment of the controlling device 100 in which the processor component 150, in executing the control routine 140, may control and/or coordinate the performance parallel community detection by one or more of the computing devices 500. FIG. 6 depicts aspects of the operating environment of one embodiment of the computing device 500 in which the processor component 550, in executing the control routine 540, performs iterations of parallel community detection. FIG. 7 depicts aspects of the operating environment of an alternate embodiment of the computing device 500 in which the processor component 350, in executing the control routine 340, additionally coordinates its own performance of iterations of parallel community detection and that of other ones of the computing device 500, and/or performs iterations of sequential community detection.

As recognizable to those skilled in the art, the control routines 140, 340 and 540, including the components of which each is composed, are selected to be operative on whatever type of processor or processors that are selected to implement applicable ones of the processor components 150, 350 or 550. In various embodiments, each of the control routines 140, 340 and 540 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 150, 350 or 550. Where one or more device drivers are included, those device drivers may provide support for any of a variety of other components, whether hardware or software components, of corresponding ones of the computing devices 100, 300 or 500.

Referring to FIGS. 5-7, each of the control routines 140 or 540 may include a communications component 149 or 549 executable by the processor component 150 or 550 to operate the interface 190 or 590, respectively, to transmit and receive communications via the network 999 as has been described. Among the communications may be those conveying at least pieces of the network data 330, the intermediate data 533 and/or the results data 335 among the computing devices 100, 300 and/or 500 via the network 999. As will be recognized by those skilled in the art, these communications components are selected to be operable with whatever type of interface technology is selected to implement corresponding ones of the interfaces 190 and 590. Correspondingly, the storage device 300 may include a communications component (not shown) executable by the processor component 350 to operate the interface 390 to also exchange such communications via the network 999.

Turning more specifically to FIG. 5, the control routine 140 may include a user interface component 148 executable by the processor component 150 to operate one or both of the controls 120 and the display 180 to provide a user interface. In monitoring the controls 120 and/or another input device (not shown), the user interface component 148 may receive input conveying commands to control performance of community detection of communities of the network 19, and/or to set one or more parameters for such performance of community detection to include in the settings data 130 that may be provided to other computing devices.

The control routine 140 may include a coordinating component 144 executable by the processor component 150 to coordinate, to at least some degree, the performance of parallel community detection by more than one of the computing devices 500 in embodiments of the community detection system 1000 in which more than one computing device 500 may be employed. In so doing, the coordinating component 144 exchanges communications with one or more of the computing devices 500 conveying information indicative of progress made in processing nodes in a current iteration and/or in performing a succession of iterations. Such communications may convey at least portions of the intermediate data 533, which may provide such indications of progress.

The control routine 140 may include an analysis component 145 executable by the processor component 150 to analyze at least the results data 335 to determine at least the effectiveness of the community detection performed by one or more of the computing devices 500. The analysis component 145 may derive a metric of modularity achieved by the community detection and/or may compare the metric of modularity achieved by the community detection to a predetermined range of modularity deemed representative of modularity values likely to be achieved in the case of real world networks. Alternatively or additionally, the analysis component 145 may employ an indication of the known modularity of the network 19 that may be included in the network data 330 to evaluate the degree to which the modularity of the results of the community detection deviates therefrom.

Turning more specifically to FIG. 6, the control routine 540 may include a parallel detection component 543 executable by the processor component 550 to perform iterations of parallel detection of communities within the network 19. In the manner that has been described, the parallel detection component 543 initially assigns all of the nodes 10 of the network 19 to individual communities, and then commences performance of iterations of parallel detection. In each such iteration, the parallel detection component 543 derives metrics of connectedness for all communities in the network 19. Then, for each node 10, the parallel detection component compares the connectedness metric of the community of that node to the connectedness metric of the other communities to which the neighboring nodes belong. If the degree of connectedness of one of those other communities is greater than the degree of connectedness of the community to which that node belongs, then that node is selected to be reassigned to whichever one of those other communities has the greatest degree of connectedness. The parallel detection component 543 then effects the changes in community assignment of the nodes 10 selected to be reassigned to another community. The parallel detection component 543 may maintain indications in the intermediate data 533 of progress in processing each of the nodes 10 and/or in performing a succession of such iterations. The parallel detection component 543 may also maintain indications in the intermediate data 533 of assignments of different ones of the nodes 10 for processing to different threads and/or different ones of the cores 555 of the processor component 550.

The control routine 540 may include a pinning component 5433 executable by the processor component 550 to randomly select ones of the nodes 10 in each iteration to be prevented from switching communities to which they are assigned. In the manner that has been described, the pinning component 5433 may make the random selection of the nodes 10 to be pinned before determinations of the degree of connectedness of all of the nodes and their neighbors are made, such that the ones of the nodes 10 that are selected to be pinned may include ones of the nodes 10 that would not have changed community assignments. Alternatively, the pinning component 5433 may make the random selection of the nodes 10 to be pinned from the ones of the nodes selected to have their community assignments changed.

Turning more specifically to FIG. 7, the embodiment of the computing device 500 depicted therein is similar to the embodiment of the computing device 500 depicted in FIG. 6, but the embodiment of the computing device 500 of FIG. 7 incorporates additional features. Among those additional features may be an ability to control performance of community detection by other ones of the computing device 500 in lieu of a controlling device 100 doing so, and/or an ability to perform iterations of sequential community detection.

More specifically, the control routine 540 may additionally include a coordinating component executable by the processor component 550 to coordinate, to at least some degree, the performance of parallel community detection by at least one other computing device 500 with its own performance of parallel community detection. In so doing, the coordinating component 544 communicates with one or more other computing devices 500 conveying information indicative of progress made in processing nodes in a current iteration and/or in performing a succession of iterations. Such communications may convey at least portions of the intermediate data 533, which may provide such indications of progress.

Also more specifically, the control routine 540 may include a sequential detection component 545 executable by the processor component 550 to perform iterations of sequential detection of communities within the network 19. In the manner that has been described, the sequential detection component 545 may be triggered to perform iterations of sequential community detection as a result of the presence of ones of the nodes 10 that oscillate in their community assignments in each iteration of parallel community detection, despite the performance of a predetermined quantity of those iterations. In each iteration of sequential community detection, the sequential community detection component 545, unlike the parallel detection component 543, processes one node at a time. More specifically, in each sequential iteration, the sequential detection component, determines the connectedness metrics of the communities to which one node and its neighbors belong, compares the degrees of connectedness of those communities to determine whether or not to reassign that one node to one of the communities of one of the neighbors, and then acts on that determination. Like the parallel detection component 543, the sequential detection component 545 may also maintain indications in the intermediate data 533 of progress in processing each of the nodes 10 and/or in performing a succession of such iterations.

Figure 8:
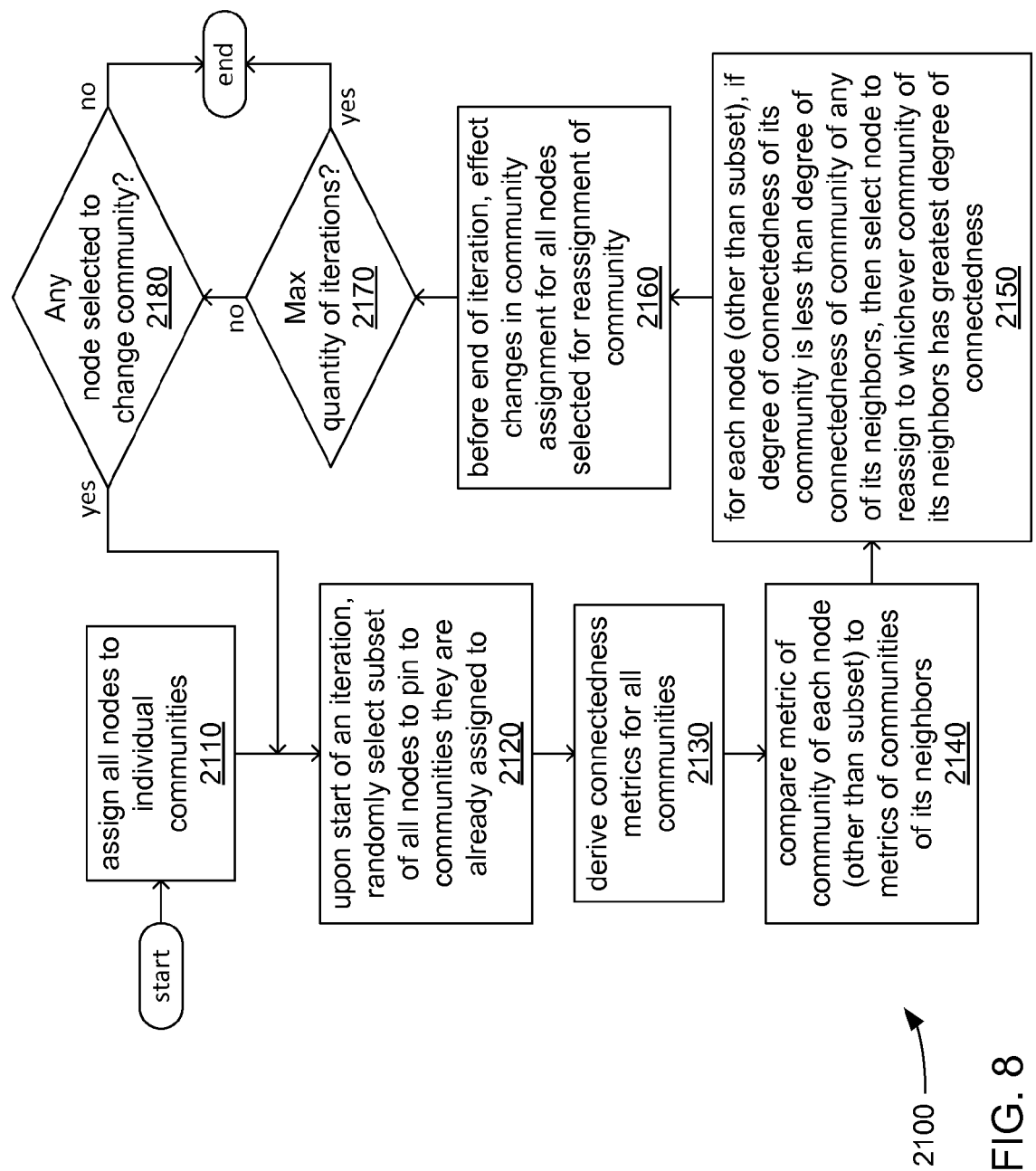
FIG. 8 illustrates an example of an embodiment of a first logic flow.

FIG. 8 illustrates an example of one embodiment of a logic flow 2100. The logic flow 2100 may be representative of the operations executed by one or more embodiments described herein. More specifically, the logic flow 2100 may illustrate operations performed by the processor component 550 in executing at least the control routine 540, and/or performed by other component(s) of the computing device 500.

At 2110, a processor component of a computing device of a community detection system (e.g., the processor component 550 of the computing device 500 of the community detection system 1000) assigns all nodes of a network (e.g., all the nodes 10 of the network 19) to individual communities in preparation for community detection to be performed. As previously discussed, this results in each node having its own community to which it is the only node assigned.

At 2120, a subset of the nodes of the network are randomly selected to be "pinned" to whatever communities they are already assigned to. As previously discussed, this pinning lasts only for the duration of a single iteration, and is done to prevent the "pinned" nodes from switching the communities to which they are assigned (or in other words, prevents them being reassigned to other communities) during that iteration.

At 2130, connectedness metrics are derived for all communities of the network. As previously discussed, the metrics may any of a variety of types based on any of a variety of functions for calculating a degree of connectedness of a community of a network, including either local or global functions.

At 2140, for all nodes of the network other than those selected for inclusion in the subset, the metrics of connectedness of the communities to which they and their neighbors are assigned are compared. As previously discussed, these comparisons are used to determine whether each such node should remain assigned to whatever community to which they are already assigned, or should be reassigned to the community of one of their neighboring nodes. At 2150, for each nodes of the network other than those selected for inclusion in the subset, if the degree of connectedness of the community to which it is assigned is less than the degree of connectedness of a community to which one of its neighbors is assigned, then the node is selected to be reassigned to whichever community among the communities to which its neighbors belong has the highest degree of connectedness.

At 2160, all of such reassignments (if there are any) are effected. As previously discussed, it may be that no nodes are selected (at 2150) to be reassigned.

At 2170, a check is made as to whether a predetermined maximum quantity of iterations of parallel community detection has been reached. It should be noted that in this embodiment, 2120, 2130, 2140, 2150 and 2160, taken together, represent one iteration of parallel community detection.

If the predetermined maximum quantity of iterations has not been reached at 2170, then at 2180, a check is made as to whether any nodes changed communities in the last iteration. If there were one or more nodes that changed communities (or in other words, were reassigned between communities) in the last iteration, then a new iteration commences at 2120.

Figure 9:
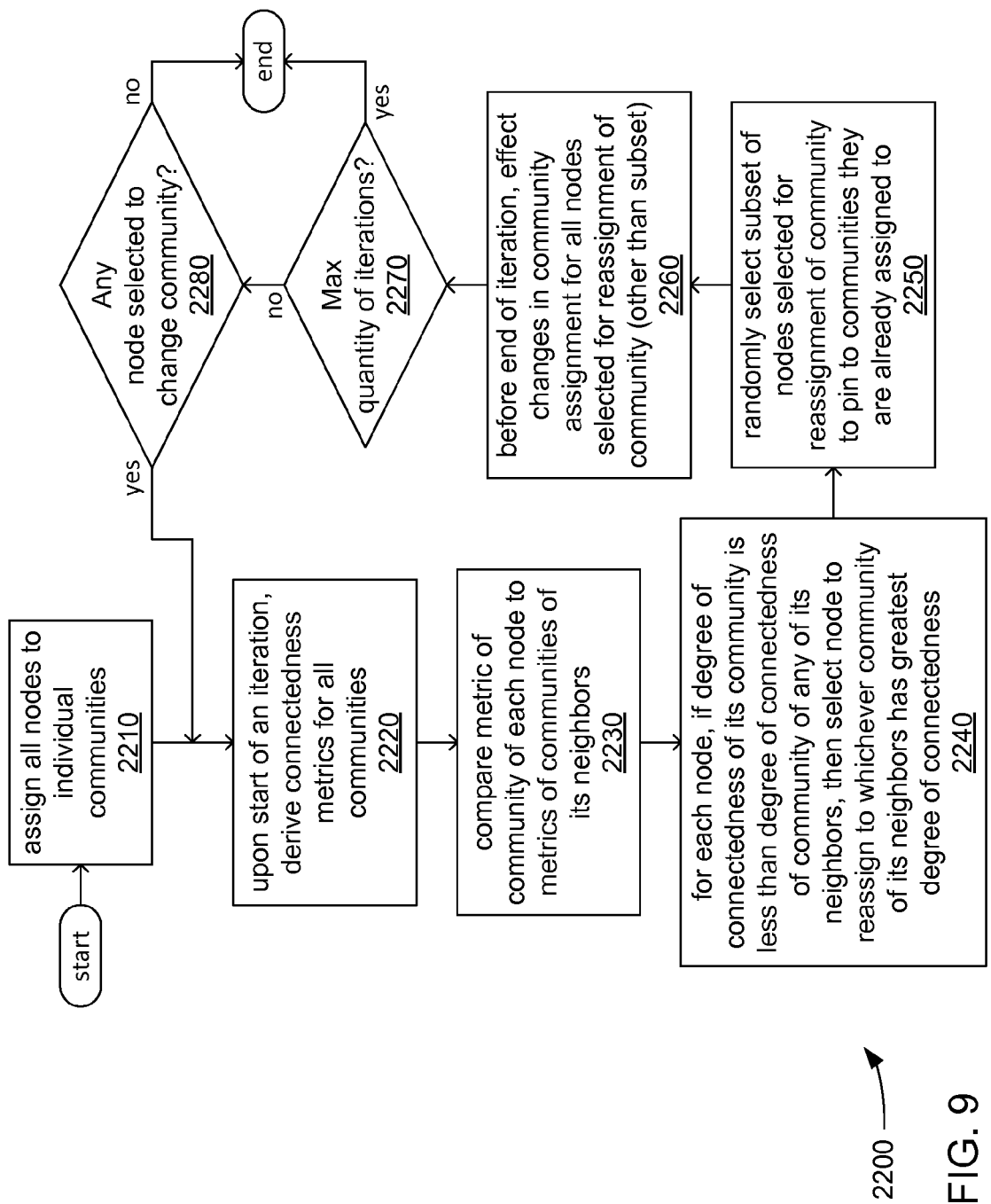
FIG. 9 illustrates an example of an embodiment of a second logic flow.

FIG. 9 illustrates an example of one embodiment of a logic flow 2200. The logic flow 2200 may be representative of some or all of the operations executed by one or more embodiments described herein. More specifically, the logic flow 2200 may illustrate operations performed by the processor component 550 in executing at least the control routine 540, and/or performed by other component(s) of the computing device 500.

The logic flows 2100 and 2200 differ in when, during the course of an iteration, the random selection of nodes occurs. In logic flow 2100, nodes are randomly selected from among all of the nodes of a network. In logic flow 2200, nodes are randomly selected only from among the nodes that have been selected to be reassigned between communities.

At 2210, a processor component of a computing device of a community detection system (e.g., the processor component 550 of the computing device 500 of the community detection system 1000) assigns all nodes of a network (e.g., all the nodes 10 of the network 19) to individual communities in preparation for community detection to be performed. Again, this results in each node having its own community to which it is the only node assigned.

At 2220, upon the start of an iteration of, connectedness metrics are derived for all communities of the network. Again, the metrics may any of a variety of types based on any of a variety of functions for calculating a degree of connectedness of a community of a network.

At 2230, for all nodes of the network, the metrics of connectedness of the communities to which they and their neighbors are assigned are compared. Again, these comparisons are used to determine whether each such node should remain assigned to whatever community to which they are already assigned, or should be reassigned to the community of one of their neighboring nodes. At 2240, if the degree of connectedness of the community to which each node is assigned is less than the degree of connectedness of a community to which one of its neighbors is assigned, then the node is selected to be reassigned to whichever community among the communities to which its neighbors belong has the highest degree of connectedness.

At 2250, a subset of the nodes selected to be reassigned are randomly selected to be "pinned" to whatever communities they are already assigned to. Again, this pinning lasts only for the duration of a single iteration, and is done to prevent the "pinned" nodes from switching the communities to which they are assigned (or in other words, prevents them being reassigned to other communities) during that iteration. At 2260, all of such reassignments for nodes not randomly selected to be pinned (if there are any) are effected.

At 2270, a check is made as to whether a predetermined maximum quantity of iterations of parallel community detection has been reached. It should be noted that in this embodiment, 2220, 2230, 2240, 2250 and 2260, taken together, represent one iteration of parallel community detection.

If the predetermined maximum quantity of iterations has not been reached at 2270, then at 2280, a check is made as to whether any nodes changed communities in the last iteration. If there were one or more nodes that changed communities (or in other words, were reassigned between communities) in the last iteration, then a new iteration commences at 2220.

Figure 10:
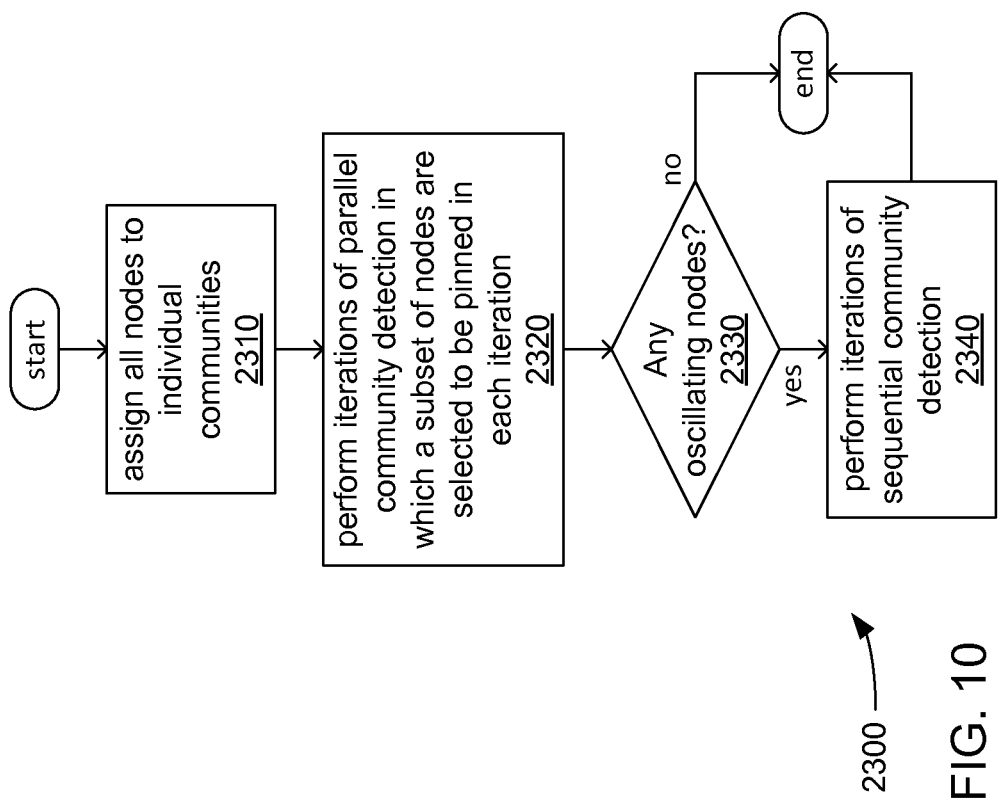
FIG. 10 illustrates an example of an embodiment of a third logic flow.

FIG. 10 illustrates an example of one embodiment of a logic flow 2300. The logic flow 2300 may be representative of the operations executed by one or more embodiments described herein. More specifically, the logic flow 2300 may illustrate operations performed by the processor component 550 in executing at least the control routine 540, and/or performed by other component(s) of the computing device 500.

At 2310, a processor component of a computing device of a community detection system (e.g., the processor component 550 of the computing device 500 of the community detection system 1000) assigns all nodes of a network (e.g., all the nodes 10 of the network 19) to individual communities in preparation for community detection to be performed. As previously discussed, this results in each node having its own community to which it is the only node assigned.

At 2320, multiple iterations of parallel community detection to identify communities within the network are performed in which a subset of the nodes are selected to be pinned in each iteration to prevent those nodes from being reassigned between communities during that iteration. Again, the subset may be randomly selected from all nodes or may be randomly selected only from the nodes that have been selected to be so reassigned.

A check is made at 2330 as to whether there are any nodes that continue to oscillate between being assigned to one or the other of two communities with each iteration of parallel community detection. In some embodiments, such a check may be performed by monitoring the quantity or percentage of nodes within the network that change assignment between communities with each iteration of parallel community detection. If the quantity or percentage falls below a predetermined threshold, then iterations of parallel community detection may cease even before a predetermined maximum quantity of iterations of parallel community detection have been performed.

If there are such oscillating nodes at 2330, then multiple iterations of sequential community detection to further complete identification of communities within the network are performed at 2340. Stated differently, if the quantity or percentage of nodes that change assignment between communities remains above the predetermined threshold despite performance of the maximum quantity of iterations of parallel community detection, then sequential community detection may be employed. Again, this takes advantage of the inherent tendency of sequential community identification to break the symmetry among clusters of oscillating nodes (e.g., a bipartite structure) to cause one or more of the nodes within such clusters to settle towards lasting community assignments.

Figure 11:
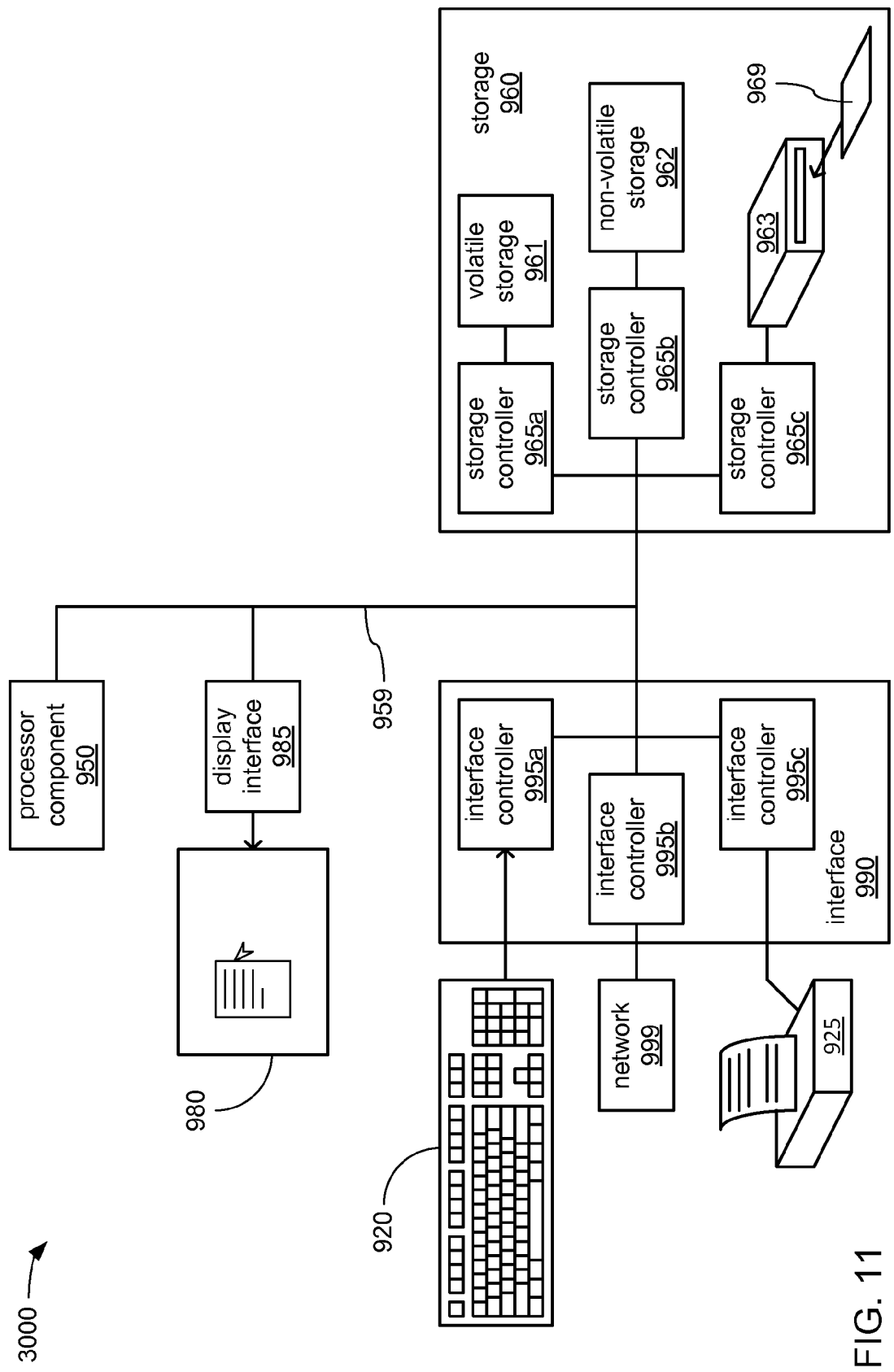
FIG. 11 illustrates an example of an embodiment of a processing architecture.

FIG. 11 illustrates an example of an embodiment of a processing architecture 3000 suitable for implementing various embodiments as previously described. More specifically, the processing architecture 3000 (or variants thereof) may be implemented as part of one or more of the computing devices 100, 300 or 500. It should be noted that components of the processing architecture 3000 are given reference numbers in which the last two digits correspond to the last two digits of reference numbers of at least some of the components earlier depicted and described as part of the computing devices 100, 300 and 500. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information over the communications media. The information can be implemented as transmissions allocated to one or more electrical and/or optical conductors. A message (including a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display 980 and a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands and/or data are optically and/or electrically conveyed. Further, at least portions of coupling 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 150, 350 and 550) may include any of a wide variety of commercially available processors, employing any of a wide variety of technologies and implemented with one or more cores physically combined in any of a number of ways.

As previously discussed, the storage 960 (corresponding to the storages 160, 360 and 560) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interfaces 190, 390 or 590) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a touch screen (e.g., the depicted example display 980, corresponding to the touch screen 580), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the display 980 may make use of timings and/or protocols that conform to any of a variety of industry standards, including without limitation, any of a variety of analog video interfaces, Digital Video Interface (DVI), DisplayPort, etc.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-program product tangibly embodied in a non-transitory machine-readable storage medium, the computer-program product including instructions operable to cause a computing device to perform operations including:
   access a network comprising a plurality of nodes, wherein the network comprises a plurality of communities of nodes; and
      perform a plurality of iterations of parallel detection of communities of the network, each iteration comprising the computing device performing operations including:
         derive, in parallel, a connectedness metric for each of the communities of the plurality of communities;
         randomly select a subset of nodes of the plurality of nodes, wherein the subset of nodes belongs to one or more communities of the plurality of communities, and wherein at least two nodes of the plurality of nodes are connected by one or more links of the network;
         pin the subset of nodes to prevent reassignment of the subset of nodes to other communities during each iteration of the plurality of iterations of parallel detection;
         compare a degree of connectedness of a community of the plurality of communities to which at least one node of the plurality of nodes belongs to a degree of connectedness of another community of the plurality of communities to which a neighboring node of the plurality of nodes belongs during each iteration of the plurality of iterations of parallel detection, wherein the at least one node is not included in the subset of nodes; and
         reassign the at least one node to the other community during each iteration of the plurality of iterations of parallel detection based on the comparison.

2. The computer-program product of claim 1, the computing device caused to perform operations including
   assign all nodes of the plurality of nodes to individual communities prior to performing the plurality of iterations of parallel detection.

3. The computer-program product of claim 1, the computing device caused to perform operations including:
   compare a degree of connectedness of a community of the plurality of communities to which each node of an another subset of the plurality of nodes belongs to a degree of connectedness of another community of the plurality of communities to which a neighboring node of the plurality of nodes belongs during each iteration of the plurality of iterations of parallel detection;
   select each node of the other subset to reassign to the other community to which the neighboring node belongs during each iteration of the plurality of iterations of parallel detection based on the comparison; and
   randomly pin at least one node of the other subset to prevent against reassignment of the at least one node to any other community during each iteration of the plurality of iterations of parallel detection.

4. The computer-program product of claim 1, the computing device caused to perform operations including cease performance of the plurality of iterations of parallel detection based on a determination that either:
   no nodes of the plurality of nodes were reassigned to another community during an iteration of the plurality of iterations of parallel detection; or
   a predetermined maximum quantity of iterations of parallel detection were performed.

5. The computer-program product of claim 1, the computing device caused to perform operations including:
   detect a continuation of oscillation of at least one node of the plurality of nodes between two communities of the plurality of communities following completion of the plurality of iterations of parallel detection of communities; and
   perform a plurality of iterations of sequential detection of communities based on detecting the continuation of oscillation.

6. The computer-program product of claim 5, the computing device caused to perform operations including cease performance of the plurality of iterations of sequential detection based on a determination that either:
   no nodes of the plurality of nodes were reassigned to another community throughout a series of iterations of sequential detection entailing processing of all nodes of the plurality of nodes; or
   a predetermined maximum quantity of iterations of sequential detection were performed.

7. The computer-program product of claim 1, the network comprising at least one of a telecommunications network, a network of computing devices, a social network of people, a map of propagation of information or a map of interactions among genes of a genetic sequence.

8. The computer-program product of claim 1, each node of the network comprising at least one of a person, a computing device, a telecommunications device or a gene.

9. A computer-implemented method comprising:
   accessing a network comprising a plurality of nodes, wherein the network comprises a plurality of communities of nodes; and
   performing a plurality of iterations of parallel detection of communities of the network, each of the plurality of iterations comprising:
      deriving, in parallel, a connectedness metric for each of the communities of the plurality of communities;
      randomly selecting a subset of nodes of the plurality of nodes, wherein the subset of nodes belongs to one or more communities of the plurality of communities, and wherein at least two nodes of the plurality of nodes are connected by one or more links of the network;
      pinning the subset of nodes to prevent reassignment of the subset of nodes to other communities during each iteration of the plurality of iterations of parallel detection;
      compare a degree of connectedness of a community of the plurality of communities to which at least one node of the plurality of nodes belongs to a degree of connectedness of another community of the plurality of communities to which a neighboring node of the plurality of nodes belongs during each iteration of the plurality of iterations of parallel detection, wherein the at least one node is not included in the subset of nodes; and
      reassigning the at least one node to the other community during each iteration of the plurality of iterations of parallel detection based on the comparison.

10. The computer-implemented method of claim 9, comprising:
assigning all nodes of the plurality of nodes to individual communities prior to performing the plurality of iterations of parallel detection.

11. The computer-implemented method of claim 9, comprising:
comparing a degree of connectedness of a community of the plurality of communities to which each node of an another subset of the plurality of nodes belongs to a degree of connectedness of another community of the plurality of communities to which a neighboring node of the plurality of nodes belongs during each iteration of the plurality of iterations of parallel detection;
selecting each node of the other subset to reassign to the other community to which the neighboring node belongs during each iteration of the plurality of iterations of parallel detection based on the comparison; and
randomly pinning at least one node of the other subset to prevent against reassignment of the at least one node to any other community during each iteration of the plurality of iterations of parallel detection.

12. The computer-implemented method of claim 9, comprising ceasing performance of the plurality of iterations of parallel detection based on a determination that either:
no nodes of the plurality of nodes were reassigned to another community during an iteration of the plurality of iterations of parallel detection; or
a predetermined maximum quantity of iterations of parallel detection were performed.

13. The computer-implemented method of claim 9, comprising:
detecting a continuation of oscillation of at least one node of the plurality of nodes between two communities of the plurality of communities following completion of the plurality of iterations of parallel detection of communities; and
performing a plurality of iterations of sequential detection of communities based on detecting the continuation of oscillation.

14. The computer-implemented method of claim 13, comprising ceasing performance of the plurality of iterations of sequential detection based on a determination that either:
no nodes of the plurality of nodes were reassigned to another community throughout a series of iterations of sequential detection entailing processing of all nodes of the plurality of nodes; or
a predetermined maximum quantity of iterations of sequential detection were performed.

15. The computer-implemented method of claim 9, the network comprising at least one of a telecommunications network, a network of computing devices, a social network of people, a map of propagation of information or a map of interactions among genes of a genetic sequence.

16. The computer-implemented method of claim 9, each node of the network comprising at least one of a person, a computing device, a telecommunications device or a gene.

17. An apparatus comprising:
a processor component;
logic, at least partially implemented by the processor component, the logic to:
perform a plurality of iterations of parallel detection of communities of a network comprising a plurality of nodes and a plurality of communities of nodes, each of the iterations to cause the processor component to perform operations including:
derive, in parallel, a connectedness metric for each of the communities of the plurality of communities;
randomly select a subset of nodes of the plurality of nodes, wherein the subset of nodes belongs to one or more communities of the plurality of communities, and wherein at least two nodes of the plurality of nodes are connected by one or more links of the network; and
pin the subset of nodes to prevent reassignment of the subset of nodes to other communities during each iteration of the plurality of iterations of parallel detection;
compare a degree of connectedness of a community of the plurality of communities to which at least one node of the plurality of nodes belongs to a degree of connectedness of another community of the plurality of communities to which a neighboring node of the plurality of nodes belongs during each iteration of the plurality of iterations of parallel detection, wherein the at least one node is not included in the subset of nodes; and
reassign the at least one node to the other community during each iteration of the plurality of iterations of parallel detection based on the comparison.

18. The apparatus of claim 17, the logic to assign all nodes of the plurality of nodes to individual communities prior to performing the plurality of iterations of parallel detection, wherein the plurality of iterations of parallel detection comprise the iteration of parallel detection.

19. The apparatus of claim 17, the logic to:
compare a degree of connectedness of a community of the plurality of communities to which each node of an another subset of the plurality of nodes belongs to a degree of connectedness of another community of the plurality of communities to which a neighboring node of the plurality of nodes belongs during each iteration of the plurality of iterations of parallel detection;
select each node of the other subset to reassign to the other community to which the neighboring node belongs during each iteration of the plurality of iterations of parallel detection based on the comparison; and
pin at least one node of the other subset to prevent against reassignment of the at least one node to any other community during each iteration of the plurality of iterations of parallel detection.

20. The apparatus of claim 17, the logic to cease performance of the plurality of iterations of parallel detection based on a determination that either:
no nodes of the plurality of nodes were reassigned to another community during an iteration of the plurality of iterations of parallel detection; or
a predetermined maximum quantity of iterations of parallel detection were performed.

21. The apparatus of claim 17, the logic to:
detect a continuation of oscillation of at least one node of the plurality of nodes between two communities of the plurality of communities following completion of the plurality of iterations of parallel detection of communities; and
perform a plurality of iterations of sequential detection of communities based on detecting the continuation of oscillation.

22. The apparatus of claim 21, the logic to cease performance of the plurality of iterations of sequential detection based on a determination that either:

no nodes of the plurality of nodes were reassigned to another community throughout a series of iterations of sequential detection entailing processing of all nodes of the plurality of nodes; or a predetermined maximum quantity of iterations of sequential detection were performed.

23. The apparatus of claim 17, the processor component comprising multiple cores to execute multiple threads in parallel, the logic to distribute derivation and comparison of connectedness metrics for communities of the plurality of communities during each iteration of parallel detection among the threads.

24. The apparatus of claim 17, the logic to coordinate derivation and comparison of connectedness metrics for communities of the plurality of communities during each iteration of parallel detection among multiple threads executed by the processor component and corresponding processor components of multiple computing devices.

25. The apparatus of claim 17, comprising an interface to couple the processor component to the network as a node of the network.

26. The apparatus of claim 17, the network comprising at least one of a telecommunications network, a network of computing devices, a social network of people, a map of propagation of information or a map of interactions among genes of a genetic sequence.

27. The apparatus of claim 17, each node of the network comprising at least one of a person, a computing device, a telecommunications device or a gene.

* * * * *